US008670352B2

(12) United States Patent
Uppalli et al.

(10) Patent No.: US 8,670,352 B2
(45) Date of Patent: *Mar. 11, 2014

(54) LINK INFERENCE IN LARGE NETWORKS BASED ON INCOMPLETE DATA

(75) Inventors: Raghavendra Uppalli, Cary, NC (US); Rajesh Balasubramaniam, Cary, NC (US); James Mark Shaw, Cary, NC (US)

(73) Assignee: Riverbed Technology, Inc., San Francisco, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/301,688

(22) Filed: Nov. 21, 2011

(65) Prior Publication Data
US 2012/0300675 A1 Nov. 29, 2012

Related U.S. Application Data

(63) Continuation-in-part of application No. 11/829,925, filed on Jul. 29, 2007, now Pat. No. 8,089,904.

(60) Provisional application No. 60/821,022, filed on Aug. 1, 2006.

(51) Int. Cl.
*H04L 12/28* (2006.01)

(52) U.S. Cl.
USPC ............ 370/256; 370/351; 370/254; 370/255

(58) Field of Classification Search
None
See application file for complete search history.

(56) References Cited

U.S. PATENT DOCUMENTS

| 8,089,904 | B2 * | 1/2012 | Balasubramaniam et al. ............................ 370/254 |
|---|---|---|---|
| 2006/0050719 | A1 * | 3/2006 | Barr et al. .................... 370/401 |
| 2007/0036092 | A1 * | 2/2007 | Pang ............................ 370/256 |
| 2007/0150722 | A1 * | 6/2007 | Aaron et al. .................. 713/155 |

* cited by examiner

*Primary Examiner* — Anez Ebrahim
(74) *Attorney, Agent, or Firm* — Robert M. McDermott

(57) ABSTRACT

A network is partitioned into a set of independent partitions, and the topology of each partition is determined, then merged to form a topology of the entire network. Preferably, the partitioning is hierarchical, wherein the network is partitioned to form individual VLAN partitions, and each of the VLAN partitions is further partitioned based on the nodes that are simply connected to each port of one or more selected root switches within the VLAN partition. Simple connections to each port are efficiently determined based on an aggregate address forwarding table associated with each node. Ancillary information, such as spanning tree or CDP data, may be used to facilitate efficient partitioning and/or to validate inferences that are made with incomplete information.

30 Claims, 5 Drawing Sheets

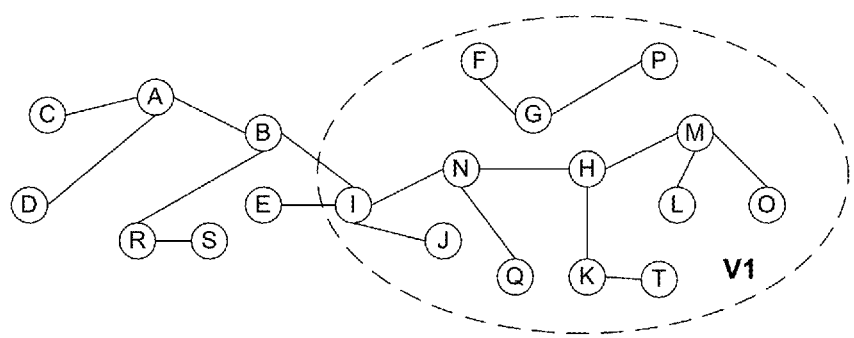
FIG. 1A
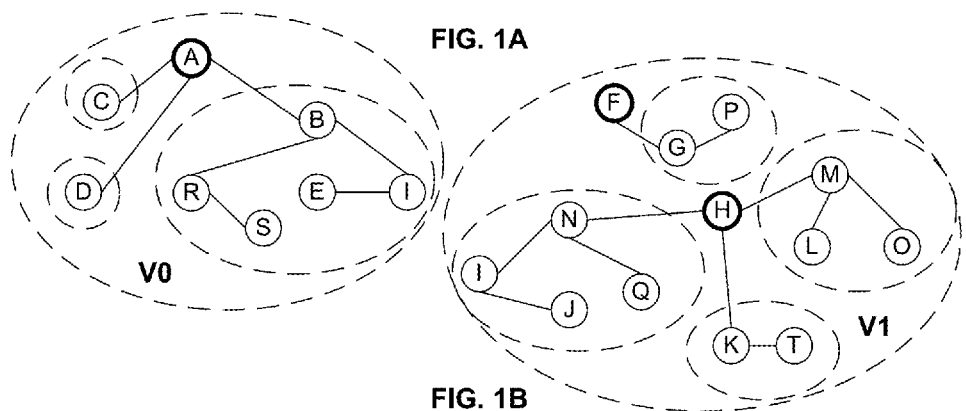
FIG. 1B
FIG. 1C

LINK INFERENCE IN LARGE NETWORKS BASED ON INCOMPLETE DATA

This application is a Continuation-In-Part of U.S. patent application Ser. No. 11/829,925, filed 29 Jul. 2007 now U.S. Pat. No. 8,089,904, which claims the benefit of U.S. Provisional Patent Application 60/821,022, filed 1 Aug. 2006.

BACKGROUND AND SUMMARY OF THE INVENTION

This invention relates to the field of network analysis systems, and in particular to a method and system for determining a topology of one or more networks based on information contained in Address Forwarding Tables (AFT) associated with switches of the network.

Effective management of a network generally requires knowledge of the topology of the network. A preferred user interface for visualization and analysis tools generally provides a display of the topology of the network, wherein colors and other graphic features are used to illustrate features and performance characteristics related to the network nodes and their interconnecting links.

In many situations, and particularly when dealing with large and active networks, the information available for determining how the network nodes are operationally connected to each other is incomplete and/or outdated. As new devices are added to a network, to replace or augment existing capabilities, the database that is used to model the network is often not correspondingly updated; as new routes are created, deleted, or modified, either intentionally or unintentionally, the differences between the actual network and the modeled network continue to increase.

Automated systems have been developed to query devices on the network for their current configuration, and this information is used to update and/or regenerate the network model, including a model of the network topology and other models. Of particular note, switching devices are generally configured to maintain "address forwarding tables" (AFT) that identify the port to which messages addressed to each address should be forwarded. These forwarding tables are generally created dynamically; when a message from a new address is received on a given port, the switch adds the new address to the address forwarding table of the given node, based on the assumption that the network is acyclic and the communication path from and to that address is bidirectional. Conventional bridges use algorithms, such as the Ethernet spanning tree algorithm to assure that the network is acyclic, even in the presence of a cyclic physical configuration. By querying all switches in the network for their current address forwarding tables, the current interconnectivity of the switches can be determined by creating a tree structure based on a determination of which ports are directly connected to each other.

"Topology Discovery in Heterogeneous IP Networks", by Breitbart et al., *Proceedings of INFOCOM* 2000, March 2000, provides a technique for determining network topology when substantially complete address forwarding table information is provided. Breitbart determined that, in an acyclic network, if the union of the AFTs of two ports contains all of the network nodes, and the intersection of the AFTs of these two ports is null, then the two ports must be directly connected to each other.

"Topology Discovery for Large Ethernet Networks", by Lowekamp et al., *SIGCOMM* '01, August 2001, provides a technique for determining network topology in the absence of complete connectivity data, including the inference of shared link segments that are not explicitly identified in the connectivity data. Lowekamp introduces the term "through set" (TS), which is the set of addresses that are input on a given port and passed through to other ports on the switch. Because the networks are assumed to be acyclic, as is typical of conventional Ethernet bridged networks, these through sets can be used to identify ports that cannot be connected (directly or indirectly) to each other. For ease of reference, the term 'simply connected' is used to indicate that two nodes are connected, either directly to each other, or via one or more intermediate nodes. By a process of elimination, and knowing that messages are passed between a pair of nodes, the ports that must be providing this connectivity can be determined. Lowekamp determined that, in an acyclic network, if the through sets of two ports contain an address in common, then those two ports cannot be simply connected; if a single pair of ports on a pair of communicating switches are found with through sets that do not contain an address in common, they must be simply connected. When one or more direct connections cannot be found to establish the link between ports that are determined to be simply connected, the existence of the link can be inferred, and a 'virtual link' can be added to the topology. If multiple nodes are identified as being simply connected to the same port, a virtual shared segment can be inferred, such as the use of a public (and not-modeled) network from this port to these multiple nodes.

Although Lowekamp's simply-connected determination provides a technique that is more robust for determining network topology than Breitbart's directly-connected determination when complete connectivity data is not available, both Lowekamp's and Breitbart's techniques are computationally demanding, particularly in a complex network comprising hundreds or thousands of switches, each with multiple ports. Additionally, neither Lowekamp nor Breitbart addresses the merging of their techniques with other known link inference techniques and other connectivity tools; and neither addresses the use of additional information, such as the presence of particularly configured virtual local area networks (VLANs), such as protocol-filtered VLANs, or the presence of aggregate links that logically group individual physical links. In like manner, although Lowekamp's technique can accommodate gaps in connectivity information, Lowekamp does not address the absence of connectivity information relative to entire segments of the network. Lowekamp assumes that all nodes are somehow connected, and, correspondingly, sufficient connectivity information is available for linking all nodes via a tree search starting from a root switch.

It would be advantageous to provide a network topology determining method and system that does not require an exhaustive comparison of the through-set of each port on each switch with the through-set of each port on every other switch on the network. It would also be advantageous to provide a network topology determining method and system that achieves efficiencies based on ancillary information related to the port characteristics. It would also be advantageous to assure that the determined topology includes all identified nodes, regardless of their interdependent connectivity.

These advantages, and others, can be realized by a method and system that partitions a network into a set of independent partitions, determines the topology of each partition, then merges the topologies to form a topology of the entire network. Preferably, the partitioning is hierarchical, wherein the network is partitioned to form individual VLAN partitions, and each of the VLAN partitions is further partitioned based on the nodes that are simply connected to each port of one or more selected root switches within the VLAN partition.

Simple connections to each port are efficiently determined based on an aggregate address forwarding table associated with each node. Ancillary information, such as spanning tree or CDP data, may be used to facilitate efficient partitioning and/or to validate inferences that are made with incomplete information.

BRIEF DESCRIPTION OF THE DRAWINGS

The invention is explained in further detail, and by way of example, with reference to the accompanying drawings wherein:

FIGS. 1A-1C illustrate an example partitioning of a network in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 2:
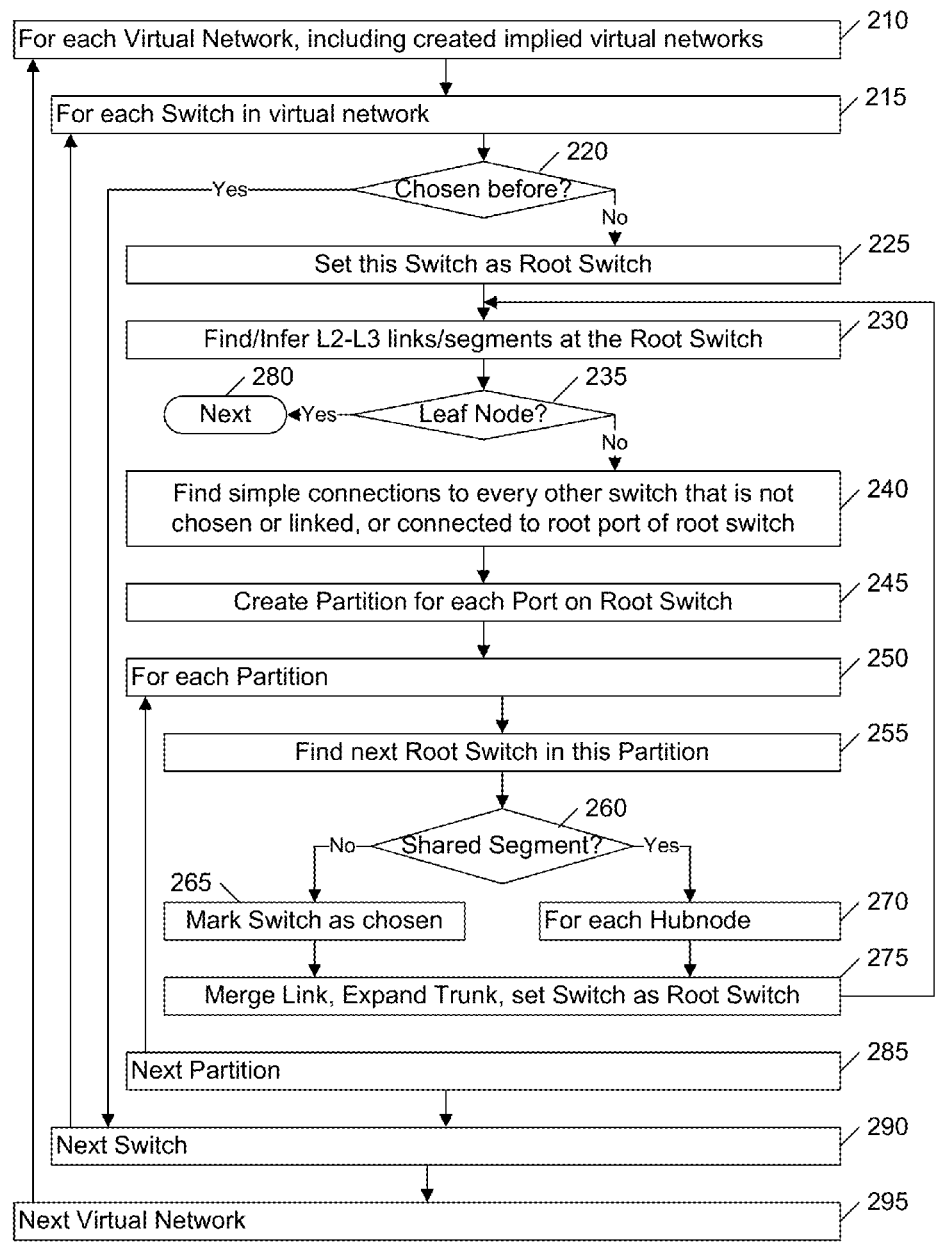
FIG. 2 illustrates an example flow diagram for inferring network topology in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

For the purposes of this disclosure, the term 'node' is used to reference any network element, including routers, switches, bridges, terminals, and so on. The term 'switch' is used to facilitate understanding of this invention by distinguishing nodes that can be configured to receive messages on one port and selectively forward that message to another of its ports. A switch is generally referred to as a port when its function as a switch is immaterial to the topic being discussed.

FIG. 1A illustrates a sample network comprising switches A-T, some of which are members of a virtual network V1. As taught by Lowekamp et al., discussed above, to determine the topology of the network, the Address Forwarding Table (AFT) of the ports of each switch are processed to define Through-Sets (TS) for each port, and the TS for each port is compared with the TS of each other port on another switch, and by "simple iteration, it is possible to map each bridge to the port it appears off every other bridge" (Lowekamp, section 5, ninth paragraph). Even with a network as simple as the one illustrated in FIG. 1A, this combinatorial comparison process could amount to over a thousand comparisons.

In accordance with one aspect of this invention, the network is partitioned into smaller networks to reduce the combinatorial complexity. As a first level of partitioning, each VLAN is processed as a separate entity. Switches that have ports that are not assigned to a VLAN are partitioned together, as if they were members of a common VLAN, herein termed an 'implied virtual network'. Multiple implied virtual networks can be defined, if there are characteristics available to distinguish among different subnetworks of nodes. If, for example, switches that have untagged ports that are assigned to a VLAN, such that a globally significant VLAN identifier is not available, are distinguishable from switches that are not assigned to a VLAN. Within this partition of untagged VLAN ports, ports that support a particular protocol can be distinguished from those that support a different protocol, and different implied virtual network partitions can be defined based on the different protocols supported by the ports.

A single switch can appear in multiple VLAN partitions, depending on the configuration of its ports. In the example of FIG. 1A, switch I includes ports that are members of VLAN V1, and other ports that are members of the implied virtual network partition of non-VLAN ports (hereinafter V0). Thus, switch I is included in both V0 and V1 partitions. Thus, the membership of these two partitions is determined to be:

V0: {A, B, C, D, E, I(3,4), R, S}; and
V1: {F, G, H, I(1,2), J, K, L, M, N, O, P, Q, T}.

The I(1,2) and I(3,4) references are used to distinguish the ports of switch I in each partition; for each of the other switches, all of the ports of the switch are within the partition.

By partitioning the original network by VLAN membership and/or other distinguishing features of each port, independent networks are effectively formed. Because each independent network will generally include fewer nodes than the original network, or at least will contain fewer ports than the original, determining the topology of each of these networks will involve fewer combinations that need to be tested, and thus the cumulative time for determining all of the topologies will likely be substantially less than the time to determine the overall network topology directly.

To further reduce the combinatorial complexity, each of these independent networks is further partitioned by identifying the set of nodes that are simply connected to each port of one or more selected 'root-switches' within the partition. In the example of FIGS. 1A-1B, switch A is selected as a first root-switch of network V0. If the address forwarding table of switch A is known to be complete, each simply connected node to each port of switch A will appear in this address forwarding table. However, in actual networks, rarely are forwarding tables known to be complete.

In accordance with a further aspect of this invention, simply connected nodes are determined based on an aggregate address forwarding table associated with each node. As defined herein, the aggregate address forwarding table of a node is the union of the AFTs of each port on the node. It can be shown if any of the following conditions are true, a simple connection must exist between two nodes:

$$\Sigma AFT(i) \cap \Sigma AFT(j) \neq 0$$

$$\Sigma MAC(i) \cap \Sigma AFT(j) \neq 0$$

$$\Sigma AFT(i) \cap \Sigma MAC(j) \neq 0 \quad (1)$$

where:
$\Sigma AFT$ (i) is the aggregation of all the AFT entries in all the ports(i) of the first node;
$\Sigma AFT$ (j) is the aggregation of all the AFT entries in all the ports(j) of the second node;
$\Sigma MAC$(i) is the aggregation of all the port MAC addresses of all the ports(i) of the first node; and
$\Sigma MAC$(j) is the aggregation of all the port MAC addresses of all the ports(j) of the second node.

That is, if both nodes are configured to send messages to a common node, or if either node is configured to send messages to the other, the nodes must be simply connected to each other.

To take full advantage of the above simplification, in a preferred embodiment of this invention, a 'synonym' table is maintained for tracking duplicate MAC addresses that are assigned to the same port. A common MAC address replaces each occurrence of such synonymous addresses so that these tests, and others can be effectively applied.

FIG. 1C illustrates an example set of address forwarding tables for switches A-J and Q-T. Applying the above rule set to network V0, we find that root-switch A is simply connected to each of the other nodes in the network V0, even though the address forwarding table of root-switch A does not expressly reference nodes I or R of this network. From the address forwarding tables of root switch A, it is known that node C is on one port, node D is on another, and nodes B, E, and S are on a third port; but it is unknown how nodes I and R are connected to root-switch A.

To determine which port of root-switch A is connected to each of nodes I and R, the Through-Set test of Lowekamp et al., discussed above, can be applied. However, the exhaustive Through-Set test can be bypassed or foreshortened by assessing the address table on each of the simply connected nodes. For example, if each node includes an identification of the other node on one of its ports, these ports must be simply connected. For example, in FIG. 1C, port 2 of switch B addresses switch R, and port 1 of switch R addresses switch B; therefore, port 2 of switch B must be simply connected to port 1 of switch R, and there is no need to apply the Through-Set test. Similarly, if a port of only one of the switches addresses the other, the other ports on that node need not be considered.

From the address tables of switch I, it can be seen that port 4 is used to connect to root-switch A, and thus we only need to compare the through set of this port to each of the ports of root-switch A. Similarly, if a MAC address entry in the address table of switch I can be resolved to a particular port of root-switch A, then it would be known that port 4 of switch I connects to that port of root-switch A, and the Through-Set test would not be required. In this example, the entry in the address table does not resolve itself to a particular port on switch A, and thus the Through-Test of Lowekamp et al. is applied.

The Through-Set of a port is an aggregation of all of the address forwarding tables of the switch except the address forwarding table of this port. Lowekamp et al. have shown that if the intersection of the Through-Set of two ports on different switches is not null, these two ports cannot form a simple connection. If sufficient information is available, the simply connected ports can be found by a process of elimination.

The Through-Set of port 4 of switch I is {E}; that is, we know that data addressed to switch E that is received on port 4 will be routed through switch I from port 4 to port 3. The Through-Set of ports 1, 2, and 3 of switch A are {D, B, E, S}, {C, B, E, S}, and {C, D}, respectively. Of these, only the through-set of port 3 of switch A provides a null intersection with the Through-Set of port 4 of switch I. Because this is the only viable option, we conclude that switch I must be in the set of nodes that are simply connected to port 3 of switch A.

It is unknown which port of switch R is connected to switch A, and thus the Through-Sets of both ports 1 and 2 of switch R, {S} and {B, C, E}, respectively, must be compared to each of the through sets of switch A {D, B, E, S}, {C, B, E, S}, and {C, D}. Because the only null intersection of through sets occurs for port 1 of switch R {S} and port 3 of switch A {C, D}, switch R is also included in the set of nodes that are simply connected to port 3 of switch A.

In like manner, it is known that port 3 of switch A is used to connect to switch B. By comparing only the Through-Sets of port 3 of switch A {C, D} to the Through-Sets of all the ports of switch B {R, E, I}, {D, E, I}, and {D, R}, it can be determined that port 1 of switch B is simply connected to port 3 of switch A.

Each of the ports on the nodes that provide the simple connection to the root-node is defined as the root-port for that node; this designation will subsequently be used to trace the sets of nodes associated with each port of the root-switch, as detailed further below.

Having determined that switches I and R are simply connected to port 3 of switch A, these switches can be added to the address table of port 3 to facilitate further connectivity determinations. In like manner, switch A can be added to the address table of the root-port of each simply connected node B, E, R, S that does not have this entry.

In like manner, virtual network V1 is partitioned by selecting a first root switch, F, and determining all of the nodes that are simply connected to switch F using rule set (1), above. In this example, only nodes G and P will be determined to be simply connected to switch F; and, because switch F has only one port, these nodes form the set of nodes associated with this port of root switch F. Switch G will be added to the address table of this port on switch F, and switch F will be added to the address table of switch P, if not already present.

Because all of the nodes in virtual network V1 have not been assigned to a partition within the network, a second root switch, H, is selected and the above process is repeated to determine that nodes I, J, N, and Q are coupled to port 1 of H; nodes K and T are coupled to port 2; and nodes L, M, and O are coupled to port 3. Each of the address tables of these ports will be augmented to include the newly discovered simple connections, and switch H will be included in the address table of each of the root ports of the simply connected nodes, if not already present. In this example, all of the remaining nodes were associated with a port of root node H, and thus the partitioning of network V1 is complete.

FIG. 1B illustrates the result of the partitioning of each virtual network V0 and V1. It is significant to note that by providing partitions based on ports of a root switch within each virtual network of the network of FIG. 1A, the combinational complexity has been reduced from determining a topology of a twenty node network to determining topologies of five smaller networks, the largest of which is a five node network, and then stitching and/or overlaying these topologies to form the topology of the original network. Additionally, as noted above, by finding all of the simply connected nodes to a root switch, the address tables that are lacking information can be augmented to include this newly discovered connectivity information, thereby further simplifying the subsequent connectivity determinations.

One of skill in the art will recognize that the above partitioning of networks can be applied recursively to similarly divide each partition into smaller partitions. In FIG. 1B, for example, the five node partition {B, E, I, R, S} at port 3 of switch A can be further partitioned by determining that switch B is directly connected to this port, defining switch B as a root switch of a lower level partition, and determining the simply connected nodes to each port of switch B. In this manner, the complexity is further reduced from finding a topology of a five node network to finding a topology of a pair of two node networks. In like manner, the four node partition {I, J, N, Q} off port 1 of switch H can be partitioned based on the sets of nodes associated with the ports of switch N; and, the three node partition off port 3 of switch H can be partitioned based on the nodes associated with the ports of switch M.

In the same manner as detailed above, as each lower partition is created, the addressing tables of the nodes can be augmented with the newly discovered connectivity information, thereby progressively simplifying the process of topology determination by filling in as much information as possible.

FIG. 2 illustrates an example flow-diagram for finding the topology of a network in accordance with this invention.

The loop 210-295 is applied for each expressly defined virtual network in the overall network, as well as any other identified independent networks, herein termed implied virtual networks.

The loop 215-290 is provided to assure that the connectivity of all switches within the virtual network is determined; if a switch's connectivity has been addressed, the processing of this loop is bypassed, at 220. The as-yet-unprocessed switch is set as the current root switch, at 225. Generally, after selecting a first root switch from the virtual network, the only time a switch will arrive at block 230 from block 225 is when the switch is not simply connected to the selected root switch. For example, in virtual network V1, if switch H is selected as the first root switch, the switches F, G, and P will remain unchosen after the connectivity of all of the other nodes that are simply connected to switch H have been determined.

In setting up the order of switches to be processed by the loop 215-290, any of a variety of techniques can be used for selecting the first root switch, including a random selection. Generally, due to the combinatorial nature of the topology determining process, the best root switch is the switch whose largest partition is smaller than any other switch's largest partition. As such, if the address forwarding tables are known to be substantially complete, the switch whose longest address table is smaller than any other switch's longest address table would generally be preferred. If the completeness of the address forwarding table is unknown, a switch with many ports and a fairly uniform distribution of addresses among the ports would generally be preferred to a switch with few ports, or a switch with a skewed distribution of addresses among the ports. Other selection criteria may be used, based on other available information. For example, if spanning tree data is available, the root switch of the spanning tree may be an appropriate choice.

As detailed further below, the subsequent process beginning at 230 attempts to find the next-root switch that is directly connected to each of the ports of the current root switch. In the example embodiment of FIG. 2, each of these root switches is recursively processed from this point to determine the directly connected root switch from each of its ports, and this recursion is repeated for each subsequently determined root switch. One of ordinary skill in the art will recognize that other techniques for determining the topology of each partition off the ports of a root switch may also be used.

At 230, the ports of the root switch are assessed to determine whether this port, at the OSI data link layer (Layer 2), is coupled to one or more devices at the OSI network layer (Layer 3), rather than to another switch. The forwarding table of each port is assessed to determine if the port is coupled to one or more switches; if not, a Layer 3 connection is inferred. If there are multiple non-switch entries in the address table, a shared segment (e.g. a bridge) is inferred to provide the coupling of these multiple devices to the port.

In some instances, a port's configuration information may indicate that the port is connected to another switch, but the process detailed above may not be able to find the connection to this other switch. Such a situation may arise, for example, when the other switch had been identified as being in a different partition from the root switch based on the configuration in the address forwarding tables of the root switch and the other switch. A port's configuration may identify, for example, one or more VLANs associated with the port, but may not identify the fact that non-VLAN traffic is also communicated on that port. During the aforementioned partitioning, such ports would not be identified as part of the "non-VLAN" partition(s). However, including every port into the non-VLAN partition based on the possibility that any port may communicate non-VLAN traffic would hinder the analysis of the non-VLAN partition.

Alternatively, in a preferred embodiment of this invention, if the configuration of the current root switch indicates an interface that is not within the switches/interfaces within the current partition, the configurations of switches in other partitions are assessed to determine whether the identified port exists anywhere within the current network. If such a port exists, the configuration of the root port and the configuration of the other port are assessed to determine whether one of the ports accepts incoming non-VLAN traffic and the other port sends non-VLAN traffic. Such a situation may arise, for example, when the switches are configured as access ports or trunk ports with a native VLAN configuration, although one of skill in the art will recognize that other situations may cause the connections to appear to be in different partitions. If the ports are determined to be configured to communicate non-VLAN traffic to each other, they are determined to be connected, and the device associated with this other port is identified as the new root switch, and marked as a leaf node with regard to the root node.

Figure 5:
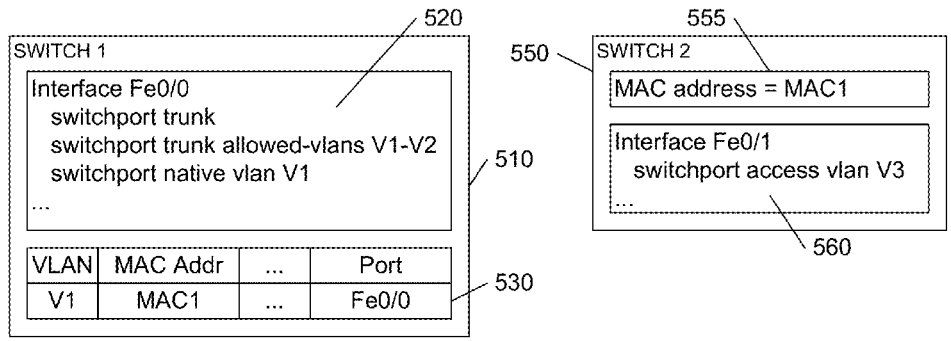
FIG. 5 illustrates an example connection between ports that are in different partitions of the network.

FIG. 5 illustrates example configuration information 510, 550 for switches SWITCH1 and SWITCH2 that do not appear to be connected. When the ports of the switches are partitioned, SWITCH1's port Fe0/0 will be associated with each VLAN within the range of V1 to V2, based on the features 520 of the interface Fe0/0, and SWITCH2's port Fe0/1 will be associated with VLAN V3, based on the features 530 of the interface Fe0/1. Based on this information, a connection between Fe0/0 of SWITCH1 and Fe0/1 of SWITCH2 would not be apparent.

However, an assessment of the forwarding table 530 for Fe0/0 indicates that the traffic for V1 is sent and received from MAC1, which is the MAC address 555 of SWITCH2. This common MAC address may indicate an interface that is common to multiple VLANs that are not logically connected, or, it may be an interface that provides access between VLANs. Accordingly, an assessment of the features of each interface is warranted, to ascertain whether these interfaces are connected.

An assessment of the features 520 of the Fe0/0 interface reveals that it is configured as a trunk with a native VLAN (V1) configured, and an assessment of the features 560 of the Fe0/1 interface reveals that it is an access port. Accordingly, it is determined that Fe0/0 of SWITCH1 is connected to Fe0/1 of SWITCH2, even though they initially appear to be in separate partitions. To avoid inclusion of the other nodes of SWITCH2 in the processing of this partition, SWITCH2 is marked as a leaf node with respect to interface Fe0/0 of SWITCH1.

Returning to the flow diagram of FIG. 2, if, at 235, the new root switch is a leaf node, i.e. a node with no further switches coupled to its non-root ports, the processing of the current partition is completed. The 'next' block 280 is used to indicate that either the next partition 285, or the next switch 290, will be processed, depending upon how this branch was reached during the recursive processing.

At 240, each switch that has not yet been identified as a root switch or a switch that is linked to the root switch is assessed to determine its connectivity to the root switch. As noted above, this determination can be made quickly using rule set (1) above. If a switch is determined to be simply connected to the root port of the root switch, that switch is marked as a potential member of a shared segment with this root switch.

At 245, all of the other switches that were determined, at 240, to be simply connected to non-root ports of the root switch are assessed to determine the port to which each switch is connected, using Through-Set and other techniques discussed above with respect to FIGS. 1B and 1C. Preferably, as noted above, the port on each switch that provides this simple connection to the root switch is identified as the root port of that switch; therefore, as the lower level partitions are being processed, only the Through-Sets of the root ports of the switches need to be compared to the Through-Sets of the ports on the root switch to make this determination. In this manner, these remaining switches are partitioned based on the port of the current root switch, and the address table of each port is augmented to include any newly discovered simple connections to that port.

The loop 250-285 is structured to process each partition to determine the next root switch, or next shared segment of switches, that is directly connected to the port providing this partition.

In accordance with one aspect of this invention, at 255, the determination of a direct connection is substantially simplified by eliminating each of the switches that cannot be directly connected to the port of the root switch corresponding to this partition. It can be shown that two ports p and q cannot be directly coupled if:

$$AFT(p) \cap AFT(q) \neq 0. \quad (2)$$

Because each switch has an identified root port that provides the simple connection to the root switch, only the intersection of the forwarding table of this root port and the current port on the root switch needs to be determined to eliminate the switches that cannot be coupled to the current port. For example, as detailed above, in FIG. 1C, port 1 of switch R is known to be the port that provides the simple connection to port 3 of root switch A. The intersection of the forwarding table of port 1 of switch R {A,B,C,E} and port 3 of switch A {B,E,I,S,R} (as augmented when switches I and R were determined to be simply connected to port A) is not null, and therefore switch R is eliminated from further processing for determining a direct connection to port 3 of switch A. In like manner, switches E, I, and S can also be eliminated, thereby leaving only port 1 of switch B as the only port that can be directly connected to port 3 of switch A.

After filtering all of the ports that cannot be directly connected to the port of the root switch that provides the partition, if more than one port remains, conventional techniques such as taught by Lowekamp and Breitbart are applied to determine which one of the remaining ports is directly connected.

If a direct connection to the current port of the root switch cannot be found directly, or if there is uncertainty in the determination, other sources of connectivity information may be used to further narrow the field of potential next root switches. For example, a number of tools exist for discovering 'neighbors' in a network, such as CDP (Cisco Discovery Protocol) and others. Similarly, spanning-tree data is often available from nodes that use spanning-tree routing algorithms. If such information is available, it is used to resolve ambiguities, and/or validate inferences made in the above processes. For example, the 'spanning-tree cost' of each node can be used to identify the most likely next root switch; or, any node that is placed in a blocking mode by the spanning-tree routing process can be ignored as a candidate next root switch. Optionally, depending upon its type and quality, such data may be used to bypass the above processes for any partition whose topology is well defined by this data.

If a unique next-root, or next-shared-segment, cannot be found, an elimination and priority ordering scheme is preferably used to select the next-root from the remaining simply connected switches. The aforementioned AFT-Intersection test (2) is applied to eliminate any switch whose root port cannot be directly connected to the current port of the root switch. From the remaining switches, eliminate any switch that has a simple connection on its root port with another remaining switch, because this would imply that this other switch is between the root switch and this switch. If more than one switch remains after this elimination, the remaining switches are assigned a 'score', typically based on a heuristic assessment of ports that are likely to be connected together, and the next root switch is selected based on this score. If multiple switches have the same score, one is selected arbitrarily.

The following example heuristic priority scheme has been shown to be effective:

1. The address table of the root port of the candidate switch includes the root switch, AND the address table of the current port of the root switch includes the candidate switch.

2. The Through-Set intersection of the root port of the candidate switch and the current port of the root switch is null.

3. The address table of the root port of the candidate switch includes the root switch, or, the address table of the current port of the root switch includes the candidate switch.

If, at 260, a single switch is identified as the next root switch, that switch is selected and marked as such, at 265. If multiple switches are identified as a shared segment that is connected to the port of the current root switch, then each of the switches in the shared segment is identified as a hub node and processed as the next root switch, at 270.

At 275, the direct link between the port on the root switch and the root port of the new root switch is merged with the links that have been determined thus far. If the link corresponds to a trunk, each physical link corresponding to this logical aggregate is merged.

Figure 3:
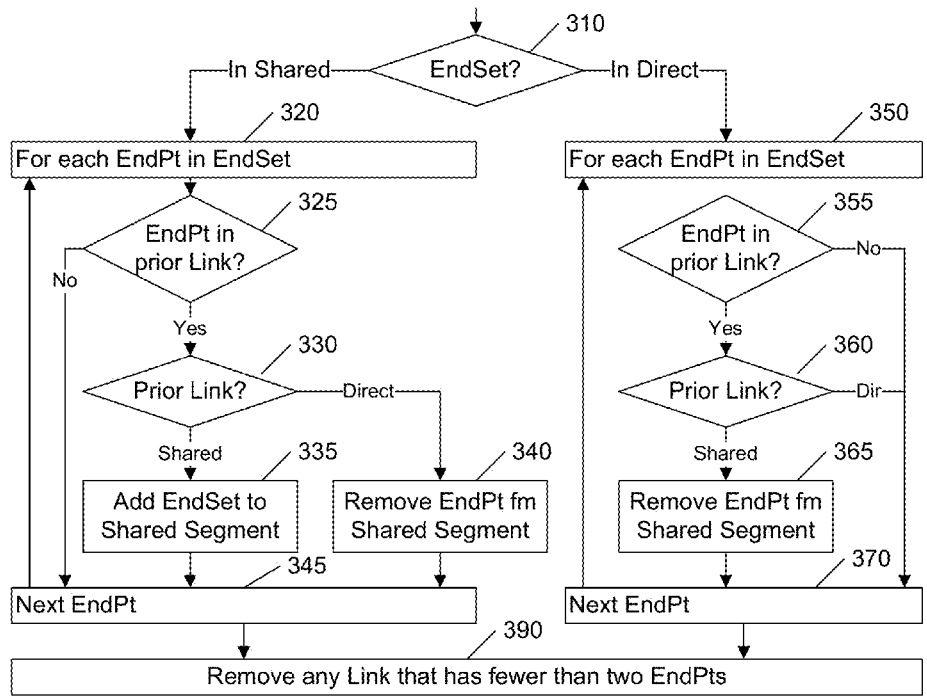
FIG. 3 illustrates an example flow diagram for prioritized merging of links in accordance with this invention.

FIG. 3 illustrates an example flow diagram for a prioritized merging of links. Generally, shared segments are inferred when there is insufficient information available to infer a simple direct connection; preferably, if a direct connection inference conflicts with a shared segment inference, the direct connection inference takes priority.

As each link is inferred and added to the database of inferred links, it is compared with previously inferred links to determine if a priority inference should be applied. The processing is dependent upon whether the new link is inferred to be a direct connection or a shared segment, at 310. If the new link is a direct connection, the loop 350-370 checks each of the endpoints to see if it is included in a prior inferred link, at 355. If, at 360, the prior inferred link is a shared segment, this endpoint is removed from the inferred shared segment, at 365.

If, at 310, the new link is a shared segment, the loop 320-345 checks each of the endpoints to see if it is included in a prior inferred link, at 325. If the prior link is a direct connection, this endpoint is removed from this new shared segment inference, at 340. If the prior link is also a shared segment, the new shared segment is merged with the prior shared segment, at 335.

After processing all of the endpoints, if any inferred link has been reduced to having fewer than two members, it is deleted, at 390.

By partitioning the network into smaller and smaller partitions, based on the nodes that are simply connected to the ports of each determined root switch, the task of determining the connectivity of a network is reduced to a recursive determination of the link to a next root switch from each port, and a stitching together of these links. Because each of the partitions are generally substantially smaller than the next higher level network, and because the creation of each partition facilitates a completion of each port's address table, the task of deducing/inferring connectivity in the presence of limited information is substantially reduced and/or the consequences of an erroneous inference are limited in scope.

One of skill in the art will recognize that the techniques disclosed herein may be applied in a variety of scenarios other than the paradigm scenario detailed above. For example, networks are often partitioned into substantially independent networks using techniques other than virtual LANs. The HVNES product from OPNET Technologies, Inc., allows multiple VNE (Virtual Network Environment) servers to be arranged in a hierarchical master/slave arrangement, wherein each slave network is disparately managed, with minimal connectivity between or among nodes of the slave networks. In such an environment, each slave network can be independently analyzed to infer the topology within its domain, while a smaller 'upper-level' network comprising only the nodes that interconnect the slave domains can be analyzed to provide a topology for 'stitching together' these slave networks. Preferably, a priority merging of inferred links would be used, such as discussed above with regard to FIG. 3, wherein links that are determined at the upper level are given priority to those discovered within the slave networks.

In the above processing, one or more 'conflicts' may be produced among the determined links between nodes. As noted above, for example, a single interface may be used by different VLANs, but if these VLANs are not accessible to each other, the creation of a connection between these VLANs at the port with this interface would not be appropriate. Because the address forwarding table is often incomplete, and may change frequently, the links identified during the processing of one partition may conflict with the links identified in the processing of another partition. For example, the same interface may appear as the endpoint of two different links. In some instances, the conflicting links should be merged, while in other instances, one of the links should be determined to be erroneous and removed.

For each of the determined conflicting links, a hierarchy of priorities may be established to eliminate less reliable link determinations. For example, in an example embodiment of this invention, the following priority may be established:

i) Prefer direct links over shared links. Shared links are an indication that there is some other device in between the endpoints;

ii) Prefer links that are inferred based on data from the same VLAN over those based on data from different VLANs;

iii) Prefer links that are inferred based on both endpoints seeing each other over those based on only one-way data visibility;

iv) Prefer links by data from more VLANs over those that are inferred by fewer VLANs;

v) Prefer links with endpoint type compatibility;

vi) Prefer links with endpoint hierarchy compatibility (an aggregate interface is likely connected to another aggregate interface instead of a non-aggregate interface);

vii) Prefer links that may have an explicit indication (user description) of connectivity over those that do not; and, viii) If all of the above fail to resolve the link conflict, choose a link based on endpoint names, but assign it a low confidence factor.

Figure 4:
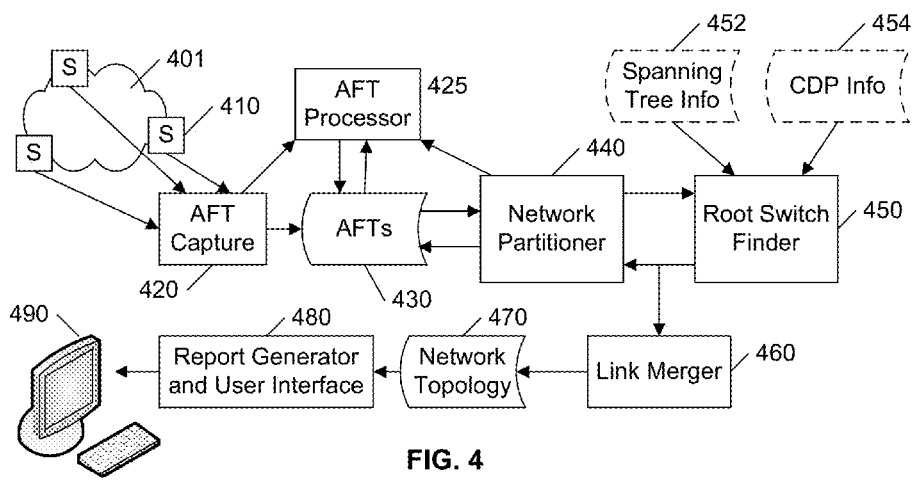
FIG. 4 illustrates an example block diagram of a link inference system in accordance with this invention.

FIG. 4 illustrates an example block diagram of a link inference system in accordance with this invention. This system may be a combination of hardware and software components, the software components being embodied within a non-transitory computer-readable medium.

An AFT capture component 420 is configured to obtain configuration information related to nodes of a network 401, and to provide address forwarding tables (AFTs) 430 corresponding to the switching devices 410 within the network 401. This information may be obtained directly from the nodes 410, or from a database or other source of information regarding the network 401.

An AFT processor 425 may be configured to pre-process the configuration information or post-process the address forwarding tables 430 to augment the information contained in the address forwarding tables 430. For the purposes of this disclosure, the term 'anomalous forwarding information' is used herein to describe a situation in which an address forwarding table does not necessarily reflect the actual correspondence between each VLAN and the port/interface that is used to communicate traffic on that VLAN. As indicated in FIG. 4, the identification and processing of the anomalous forwarding information may be signaled by the capture component 420 or the network partitioner 440 (detailed below), and/or the AFT processor 425 may be configured to automatically initiate checks for such anomalous information.

For example, the configuration information may indicate that some VLANs are configured to use other VLANs, or that some nodes may include features that obscure the actual configuration of the nodes, or other potentially anomalous indicators. One of skill in the art will recognize that the occurrence of any particular feature in the configuration information may provide an indication that anomalous forwarding information may be present, and this indication can be used to initiate a pre-process to further determine a more complete or more accurate address forwarding table for each node.

FIGS. 6A-6B and 7A-7B illustrate examples of the processing of configuration information based on the information contained in the configuration information that is indicative of possible anomalous forwarding information.

Figure 6A:
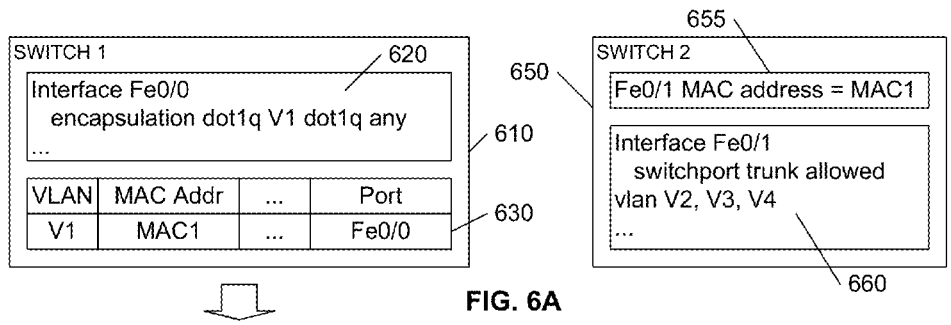
FIG. 6A illustrates an example address forwarding table that contains anomalous forwarding information, which does not provide an explicit correspondence between each port and each virtual network that is associated with the port.
Figure 6B:
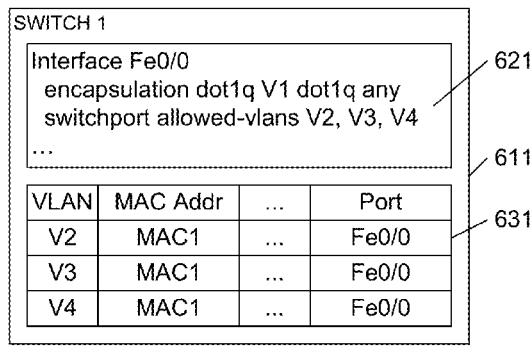
FIG. 6B illustrates an example augmentation of the address forwarding table of FIG. 6A to include an explicit correspondence between each port and each virtual network that is associated with the port.

FIGS. 6A-6B illustrate the pre-processing of configuration information when the configuration information 610 of an interface (Fe0/0) of SWITCH1 indicates that one VLAN (V1) is configured to route traffic of other VLANs (conventionally termed "double-tagging" or "Q in Q"). The "encapsulate" feature 620 in the configuration information 610 instructs the switch to encapsulate any VLAN traffic into traffic for transmission over VLAN V1 (and, correspondingly, to un-encapsulate any received V1 traffic). Accordingly, the (anomalous) addressing forwarding table 630 need only contain an identification of the port (Fe0/0) associated with the traffic of VLAN V1. Because of this encapsulation, the identification of the other VLANs that are processed through this switch is not explicitly contained in the address forwarding table 630.

In accordance with an aspect of this invention, the presence of an indication that some VLAN traffic may be 'hidden'/'encapsulated' within another VLAN, and therefore indicating a potential anomalous forwarding table, causes a pre-processing of the configuration information to determine a more appropriate/explicit mapping of the VLANs that actually utilize the encapsulating interface. In the example of FIG. 6A, the MAC address (MAC1) associated with the interface Fe0/0 is found to be the address 655 of an interface (Fe0/1) of a second switch (SWITCH2). An analysis of the configuration information 650 of this switch indicates that this interface (Fe0/1) is configured 660 to be used for the communication of traffic of VLANs V2, V3, and V4. Accordingly, any traffic of VLANs V2, V3, and V4 from this interface will be encapsulated as traffic on VLAN V1 at SWITCH1. In like manner, traffic received at SWITCH1 on VLAN V1 will be un-encapsulated into traffic on VLANs V2, V3, V4 and communicated to SWITCH2.

Based on this determination that the traffic of VLANs V2, V3, and V4 is communicated as traffic on VLAN V1 at SWITCH 1, the determined configuration table of SWITCH 1 is augmented to include an explicit identification of these VLANS. As illustrated in the example of FIG. 6B, the configuration data 611 of SWITCH 1 is amended to include the feature 621 that VLANs V2, V3, and V4 are allowed at interface Fe0/0, and the address forwarding table 631 is amended to explicitly include the fact that traffic for each of these VLANs V2, V3, and V4 is communicated via this interface Fe0/0. In like manner, the address forwarding table of each node that includes a reference to the encapsulating VLAN V1 may be augmented to include each of the VLANs V2, V3, and V4.

In some instances, the configuration information may indicate that the 'encapsulated' VLANs are VLANs within a range of values, such as "allowed-VLANs 50-150", indicating that any of the identified hundred and one (50, 51, 52, . . . 150) VLANs will be embedded within the encapsulating VLAN, even though only a few of these VLAN identifiers may actually be in use. To avoid an unnecessary inclusion of unused VLANs in the augmented configuration data 611, the configuration data is further assessed to determine which VLANs are actually in use. For example, the utility command "Show VLANs" can be applied to switch 2 to identify "active" VLANs with the specified allowed range. In such a case, only these active VLANs will be included in the augmented configuration data 611.

Figure 7A:
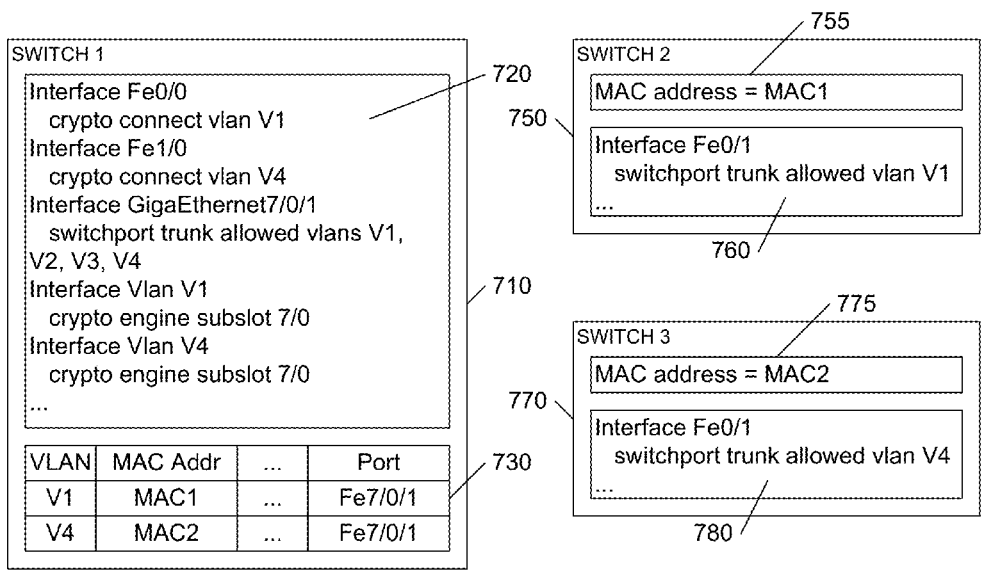
FIGS. 7A-7B illustrate another example address forwarding table that contains anomalous forwarding information, and a corresponding augmented address forwarding table.
Figure 7B:
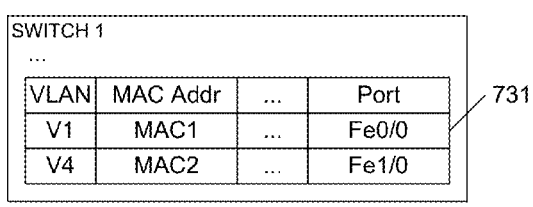

FIGS. 7A-7B illustrate an example pre-processing of anomalous forwarding information that may be associated with, for example, a particular vendor's use of existing standards to embody features that are not explicitly supported by the standard. In this example, SWITCH1 includes a "crypto engine" that is configured to encrypt/decrypt the traffic of specified VLANs, in this example, V1 and V4.

Because the 'standard' configuration information for devices does not include internal routing within a switch, such as selective routing to/from the aforementioned crypto engine, the vendor of this crypto-enabled switch has adopted a particular convention for the configuration of the device within the conventional standard. In this vendor-specific convention, the internal crypto engine is identified 720 in the configuration information 710 as a "subslot" (7/0) feature and the address forwarding table 730 identifies which VLANs' traffic (V1, V4) is to be sent to an interface (Fe7/0/1) of this subslot (7/0) for encryption/decryption. However, this identified interface (Fe7/0/1) is internal to SWITCH1, and does not represent the actual port that is used to communicate the resultant encrypted/decrypted data. Inclusion of this internal port address in the address forwarding table that is subsequently used to determine the interconnections among nodes will lead to erroneous and/or confusing results.

In an embodiment of this invention, the configuration data of select nodes may be analyzed to determine whether the configuration data may contain anomalous forwarding information, such as the identification of internal ports rather than the external ports of a device, and to provide a more appropriate address forwarding table that is suitable for a subsequent determination of the connections to these external ports.

In the example of FIG. 7A, an analysis of the configuration information 710 reveals that the port (Fe7/0/1) in the address forwarding table 730 is associated with a crypto engine, and that traffic of VLANs V1 and V4 will be processed by that crypto engine. Further analysis reveals that these VLANs V1 and V4 are assigned to (external) interfaces Fe0/0 and Fe1/0, respectively. A check of the features 760, 780 of the configuration data 750, 770 of switches SWITCH2 and SWITCH3 confirms the fact that the MAC addresses 755, 775 of the interfaces (MAC1, MAC2) identified in the address forwarding table 730 correspond to interfaces that are assigned to VLANs V1 and V4.

Having determined that the traffic of V1 and V4 use the external ports Fe0/0 and Fe1/0, respectively, the anomalous address forwarding table 730 is amended 731 to reflect these external ports (Fe0/0, Fe1/O) instead of the internal port (Fe7/0/1), as illustrated in FIG. 7B.

As noted above, one of skill in the art will recognize that other situations may present anomalous address forwarding tables that do not necessarily reflect the actual correspondence between VLANs and their corresponding interfaces/ports for communication on the network, and that such situations may be corrected based on the principles disclosed in the presentation of example anomalous forwarding information of FIGS. 6A-6B and 7A-7B.

The preferred system includes a network partitioning component 440 that is configured to partition an input network into partitions based on a given partitioning criteria, such as partitions based on membership in a virtual network, or membership based on being simply connected to ports of a particular switch. Preferably, the network partitioning component 440 is configured to determine each set of simply connected nodes based on the aggregate AFT tests (1), detailed above.

In a recursive embodiment of this invention, the system also includes a root switch finder 450 that is configured to identify a subsequent/next root switch associated with each of the partitions identified by the network partitioner 440. Preferably, the root switch finder component 450 is configured to eliminate candidate nodes in this determination by applying the ATF intersection rule (2) to each root port of each candidate switch. Also preferably, the root switch finder 450 includes heuristic tests that are configured to identify a likely next root port from among the candidate nodes, as detailed above.

As each next root switch is determined, a link merger 460 receives the determined connectivity to this next root switch from the current root switch and merges this information with prior determined links to create a network topology 470, using, for example, the example flow diagram of FIG. 3. Optionally, as discussed above, the root switch finder 450 is also preferably configured to use ancillary information, such as spanning tree information 452 and CDP information 454, to validate and/or determine or infer the next root switch associated with each partition. As each next subsequent root switch is determined, the network partitioner 440 is preferably configured to partition the remaining nodes according to their connectivity to ports of the current root switch.

A report generator and user interface 480 is provided to present the determined topology and other relevant information to a user via a display device 490. In a preferred embodiment, the user interface 480 is interactive, allowing the user to selectively display some or all of the topology in various levels of detail and in various forms, including graphic representations, such as network diagrams as illustrated in FIGS. 1A-B, hierarchical tree diagrams, and so on. In a preferred embodiment, individual partitions may be selected for presentation on the display device 490. For complex topologies, nodes within partitions may be grouped and represented by a single icon, such as an icon that represents a select root node and all of the nodes beneath that root node in a hierarchical representation. Options for 'drilling down' to view the nodes at the lower levels of the hierarchy may also be provided.

The report generator may also be configured to process the network topology into formats suitable for use by other network analysis tools, or to receive information from other network analysis tools, such as performance data, to enable the user interface to display such data in the context of the network topology.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of a combination of hardware portions (e.g., including discrete and integrated electronic circuitry) and software portions (e.g., computer programming), the software components being embodied within a non-transitory computer-readable medium;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A method comprising:
receiving, at a network analysis machine, a plurality of address forwarding tables that define address sets associated with ports of nodes in a network,
selecting a root node from the nodes of the network,
creating, by the network analysis machine, a partition associated with each port of the root node that includes each of the other nodes of the network that are simply connected to the port, based on the address forwarding tables,
if any nodes remain that have not been included in at least one partition, selecting a node from among the remaining nodes as the root node and repeating the creating of partitions associated with each port of the root node that includes each of the other nodes of the network that are simply connected to the port, until each node of the network has been included in at least one partition,
determining, by the network analysis machine, a topology of each partition based at least in part on the address forwarding tables
merging, by the network analysis machine, the topologies of the partitions to determine a topology of the network, and
presenting, on a display device, a representation of at least a portion of the topology of the network.

2. The method of claim 1, wherein the address forwarding tables includes an indication of each port and any virtual networks within the network that are associated with the port, and the method includes:
identifying, by the network analysis device, an address forwarding table that contains anomalous forwarding information that does not provide an explicit correspondence between each port and each virtual network that is associated with the port, and
augmenting, by the network analysis device, the address forwarding table to provide the explicit correspondence between each port and each virtual network that is associated with the port.

3. The method of claim 2, wherein the anomalous forwarding information corresponds to information associated with encapsulation of traffic of a first virtual network into traffic of a second virtual network.

4. The method of claim 3, wherein the augmenting includes adding the first virtual network to the address forwarding table.

5. The method of claim 2, wherein the anomalous forwarding information corresponds to information associated with a cryptographic feature associated with traffic associated with the port.

6. The method of claim 5, wherein the augmenting includes replacing an identifier of an internal port with an identifier of an external port.

7. The method of claim 1, wherein determining the topology of each partition includes identifying a connection between the root node and another node that is not included in the partition of the root node.

8. The method of claim 7, wherein identifying the connection includes identifying an access node and a trunk node with a native VLAN configuration.

9. The method of claim 1, wherein merging the topologies of the partitions includes identifying conflicting information among the determined topologies and resolving the conflicting information based on a hierarchy of preferences.

10. The method of claim 9, wherein the hierarchy of preferences is based on a determination of methods used to determine links between the ports.

11. A system comprising:
a memory that stores a plurality of address forwarding tables that define address sets associated with ports of nodes in a network,
a network partitioner that:
selects a root node from the nodes of the network,
creates a partition associated with each port of the root node that includes each of the other nodes of the network that are simply connected to the port, based on the address forwarding tables, selects a node from among the remaining nodes as the root node if any nodes remain that have not been included in at least one partition, and repeat the creating of partitions associated with each port of the root node that includes each of the other nodes of the network that are simply connected to the port until each node of the network has been included in at least one partition, and determines a topology of each partition based at least in part on the address forwarding tables, a link merger that merges the topologies of the partitions to determine a topology of the network, and a display device that displays a representation of at least a portion of the topology of the network.

12. The system of claim 11, wherein the address forwarding tables includes an indication of each port and any virtual networks within the network that are associated with the port, and the network partitioner:

identifies an address forwarding table that contains anomalous forwarding information that does not provide an explicit correspondence between each port and each virtual network that is associated with the port, and augments the address forwarding table to provide the explicit correspondence between each port and each virtual network that is associated with the port.

13. The system of claim 12, wherein the anomalous forwarding information corresponds to information associated with encapsulation of traffic of a first virtual network into traffic of a second virtual network.

14. The system of claim 13, wherein the network partitioner augments the address forwarding table by using a process that includes adding the first virtual network to the address forwarding table.

15. The system of claim 12, wherein the anomalous forwarding information corresponds to information associated with a cryptographic feature associated with traffic associated with the port.

16. The system of claim 15, wherein the network partitioner augments the address forwarding table by using a process that includes replacing an identifier of an internal port with an identifier of an external port.

17. The system of claim 11, wherein the network partitioner determines the topology of each partition by using a process that includes identifying a connection between the root node and another node that is not included in the partition of the root node.

18. The system of claim 17, wherein the network partitioner identifies the connection by identifying an access node and a trunk node with a native VLAN configuration.

19. The system of claim 11, wherein the network partitioner merges the topologies of the partitions by using a process that includes identifying conflicting information among the determined topologies and resolving the conflicting information based on a hierarchy of preferences.

20. The system of claim 19, wherein the hierarchy of preferences is based on a determination of methods used to determine links between the ports.

21. A non-transitory computer readable medium that includes a computer program that, when executed by a processor, is configured to cause the processor to:

receive a plurality of address forwarding tables that define address sets associated with ports of nodes in a network, select a root node from the nodes of the network, create a partition associated with each port of the root node that includes each of the other nodes of the network that are simply connected to the port, based on the address forwarding tables, select a node from among the remaining nodes as the root node if any nodes remain that have not been included in at least one partition, and repeat the creating of partitions associated with each port of the root node that includes each of the other nodes of the network that are simply connected to the port until each node of the network has been included in at least one partition, and determine a topology of each partition based at least in part on the address forwarding tables, merge the topologies of the partitions to determine a topology of the network, and provide a representation of at least a portion of the topology of the network for display on a display device.

22. The medium of claim 21, wherein the address forwarding tables includes an indication of each port and any virtual networks within the network that are associated with the port, and the program causes the processor to:

identify an address forwarding table that contains anomalous forwarding information that does not provide an explicit correspondence between each port and each virtual network that is associated with the port, and augment the address forwarding table to provide the explicit correspondence between each port and each virtual network that is associated with the port.

23. The medium of claim 22, wherein the anomalous forwarding information corresponds to information associated with encapsulation of traffic of a first virtual network into traffic of a second virtual network.

24. The medium of claim 23, wherein the program causes the processor to augment the address forwarding table by using a process that includes adding the first virtual network to the address forwarding table.

25. The medium of claim 22, wherein the anomalous forwarding information corresponds to information associated with a cryptographic feature associated with traffic associated with the port.

26. The medium of claim 25, wherein the program causes the processor to augment the address forwarding table by using a process that includes replacing an identifier of an internal port with an identifier of an external port.

27. The medium of claim 21, wherein the program causes the processor to determine the topology of each partition by using a process that includes identifying a connection between the root node and another node that is not included in the partition of the root node.

28. The medium of claim 27, wherein the program causes the processor to identify the connection by identifying an access node and a trunk node with a native VLAN configuration.

29. The medium of claim 21, wherein the program causes the processor to merge the topologies of the partitions by using a process that includes identifying conflicting information among the determined topologies and resolving the conflicting information based on a hierarchy of preferences.

30. The medium of claim 29, wherein the hierarchy of preferences is based on a determination of methods used to determine links between the ports.

* * * * *